Dec. 12, 1950 W. J. URBAN 2,534,186
SPROCKET WHEEL TOOTH AND PALLET CONTACT MEANS
Filed Jan. 22, 1947 3 Sheets-Sheet 1
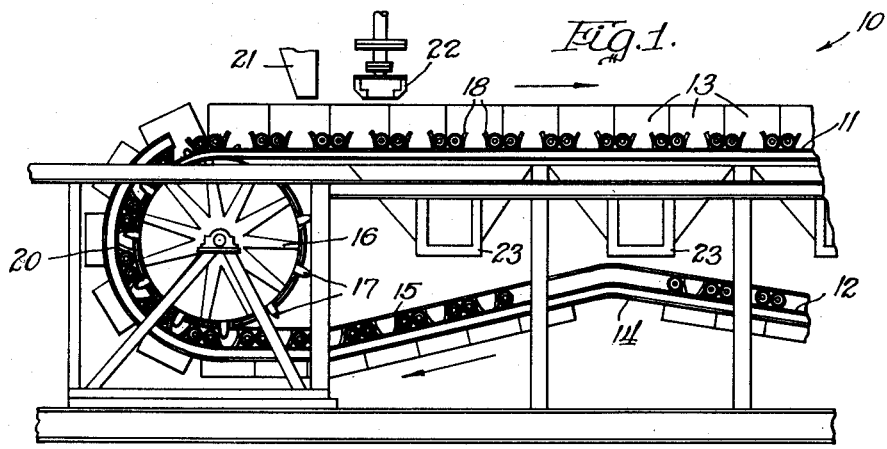
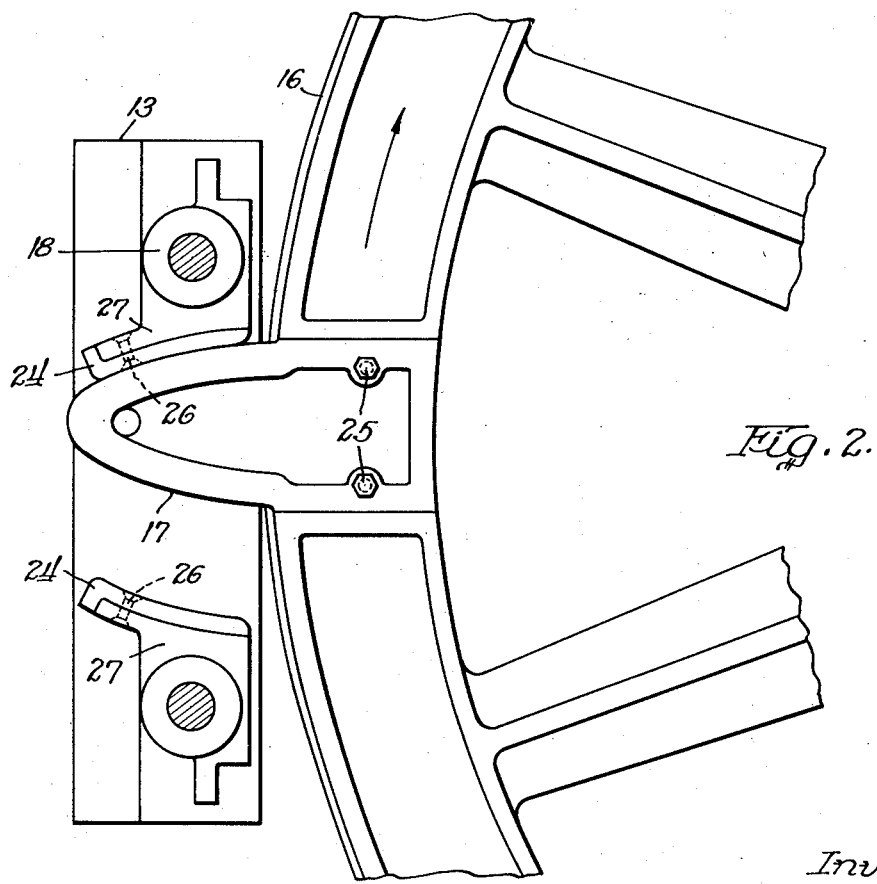
Inventor:
William J. Urban.
By Brown, Jackson, Bottcher & Dienner,
Attys.

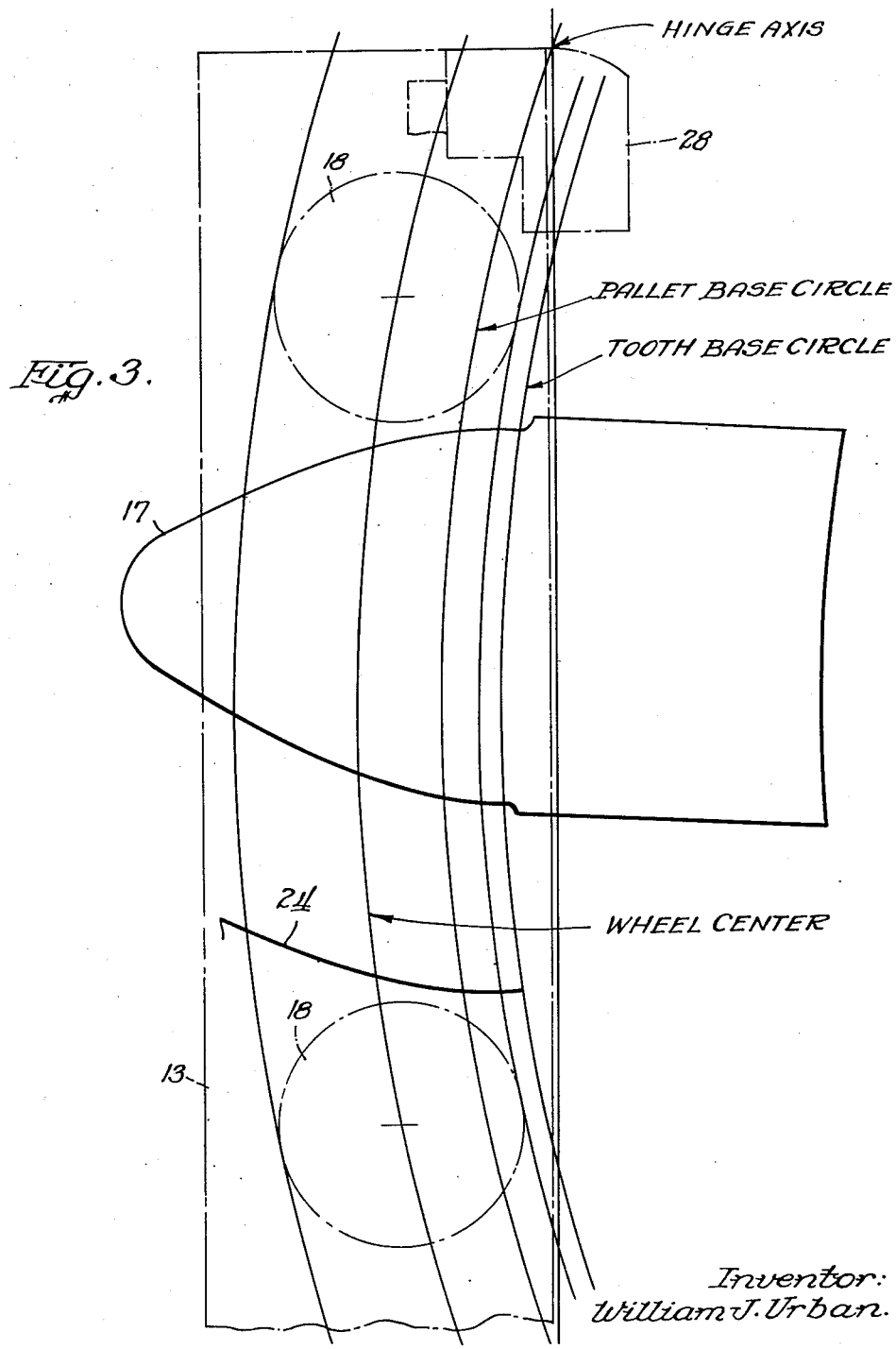

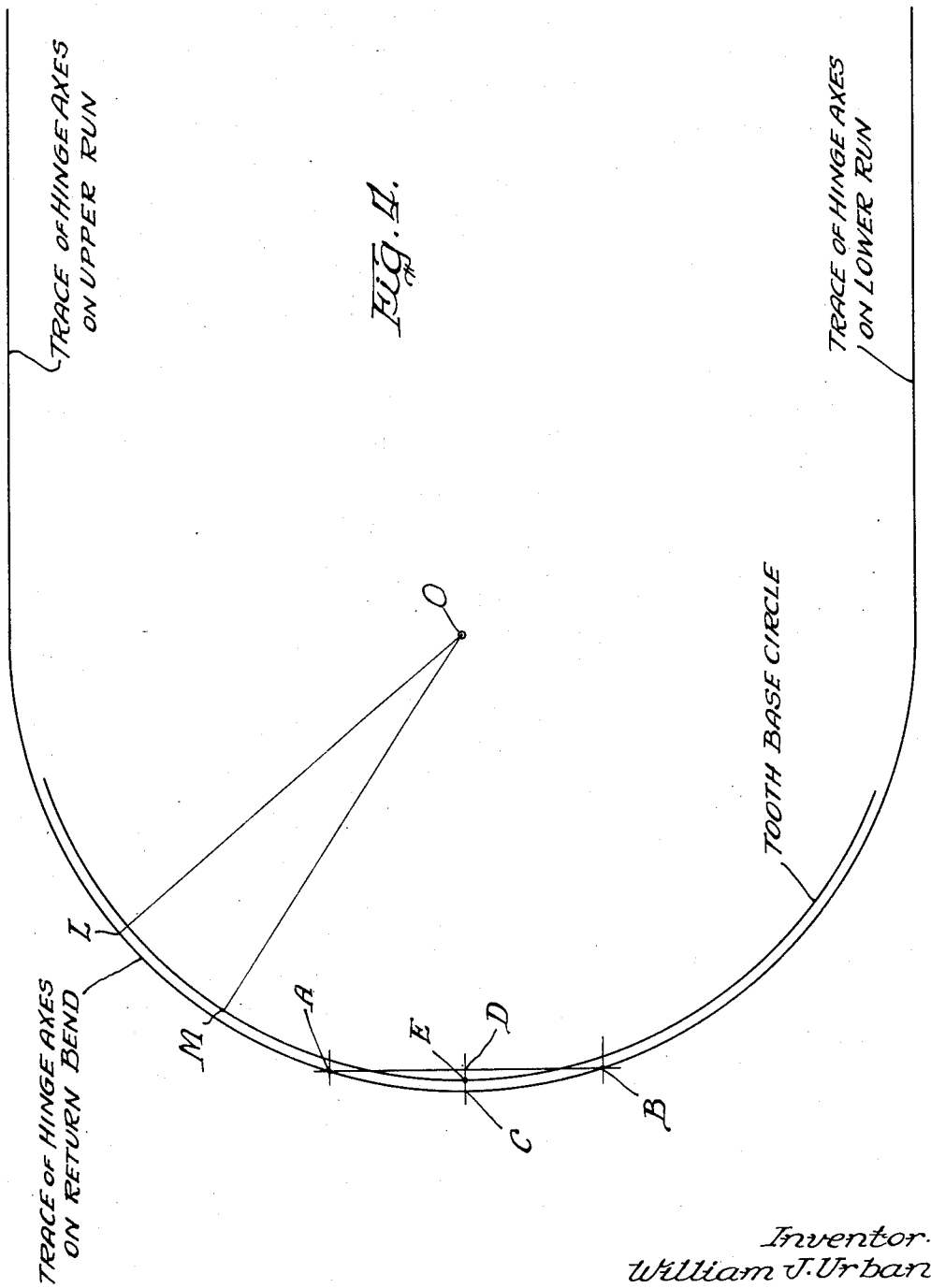

Patented Dec. 12, 1950

2,534,186

UNITED STATES PATENT OFFICE 2,534,186

SPROCKET WHEEL TOOTH AND PALLET CONTACT MEANS

William J. Urban, Glen Ellyn, Ill., assignor to American Ore Reclamation Company, Chicago, Ill., a corporation of New York Application January 22, 1947, Serial No. 723,619

3 Claims. (Cl. 198—108)

The present invention relates, generally, to improvements in continuous type sintering machines, and it has particular relation to improvements pertaining to the shape of the teeth which project from the sprocket wheels located at the return bend of such a machine and the shape of the bearing surfaces on the pallets which are engaged by such teeth.

Continuous type sintering machines are well known in the art. Such machines comprise, essentially, upper and lower runs or track sections which carry trains of pallets, and return bends at opposite ends which interconnect the upper and lower runs. At the feed end of such continuous type sintering machines, it is customary to elevate or lift the inverted pallets from the lower run to the upper run by means of a pair of sprocket wheels having projecting teeth which engage the pallets and lift them around the return bend which is usually in the shape of an arcuate track section.

The individual pallets consists of a cast pallet frame which carries a number of removable grate sections, also in the form of castings. Together, the pallet frame and the grate sections constitute considerable mass, and a pallet may weigh as much as one to two tons. When one of such pallets is elevated around the return bend, a projecting tooth on one sprocket wheel engages one side of the pallet, while an opposing tooth on the other sprocket wheel engages on the opposite side of the pallet, and together the two teeth serve to lift the pallet around the return bend.

Obviously, the bearing pressure put on the contacting surfaces of the projecting teeth, and the corresponding tooth engaging surfaces of the pallet, is very considerable. Practical design requirements places a rather narrow limitation on the size of the sprocket teeth and the tooth engaging surfaces on opposite sides of the pallet.

Accordingly, the object of the present invention, generally stated, is the provision of sprocket teeth and tooth engaging portions on opposite sides of the pallets, having such engaging surfaces that a maximum area of contact is maintained between the sprocket teeth and the tooth engaging portions when the pallets are elevated around the return bend of a continuous type sintering machine. Such a maximum area of contact reduces the bearing pressure to a minimum and reduces wear to a minimum. The practical result is that the sprocket teeth and tooth engaging plates on the pallets are given a longer useful life.

The manner in which the foregoing object is fulfilled, and certain other objects of the invention, will be made apparent from the following detailed description of a preferred embodiment of the invention, taken in connection with accompanying drawings, wherein:

Figure 1 is a fragmentary, side elevational view of a continuous type of sintering machine in connection with which the present invention may be utilized;

Figure 2 is an enlarged, fragmentary, side elevation view showing a sprocket wheel tooth, shaped in accordance with the present invention, in engagement with a correspondingly shaped tooth-engaging portion on one side of a pallet; and Figures 3 and 4 are diagrammatic views in connection with which the principles on which a sprocket wheel projecting teeth and the corresponding tooth engaging portions are shaped.

Referring first to Figure 1 of the drawings, the feed end of a continuous type of sintering machine is indicated generally at 10. In accordance with the usual construction, a track 11 is provided which serves as the upper run of the machine, and a track 12 is provided which serves as the lower run.

A train of pallets 13 are moved along the upper track 11 from left to right, with the individual pallets abutting against each other at front and back, so as to provide a continuous supporting area for material to be sintered. After the pallets 13 have traversed the upper run, they pass down around a return bend (not shown) at the discharge end of the machine, so as to run onto the lower track 12 in an inverted position.

The lower track 12 is provided with an upward bend at 14, so as to provide a decline 15, down which the inverted pallets 13 roll, so as to be picked up by a pair of sprocket wheels 16 and returned to the upper run 11.

When the sintering machine 10 is operating properly, the returning pallets 13 will roll down the decline 15, one after the other, so that the sprocket wheel teeth 17 on the sprocket wheels 16 will fit into a pocket between the pairs of rollers 18 on opposite sides of the pallets 13 and lift the pallets around the return bend and onto the feed end of the upper run or track 11. The return bend is in the form of an arcuate track section 20.

The pallets 13 are filled from a feed hopper 21 and the contents are then ignited by an igniter 22. As the pallets 13 pass down the track 11, the suction boxes 23 draw air therethrough, so as to bring about a sintering of the pallet contents.

As indicated above, the present invention is primarily directed to the shapes of the sprocket wheel teeth 17 and the corresponding tooth engaging surfaces provided on opposite sides of the pallets 13. Referring now to Figure 2 of the drawings, one of the sprocket wheel teeth 17 is shown in engagement with a tooth engaging plate 24 on one side of a pallet 13 as the pallet is lifted around the return bend or track section 20. Each tooth 17 is secured to a sprocket wheel 16 by means of a pair of shear bolts 25, so that if a tooth improperly strikes against a pallet 13, the bolts 25 will shear off and no breakage of the parts will occur. This particular mounting arrangement of the teeth 17 forms the subject matter of my copending application, Serial No. 727,331, filed February 8, 1947.

The tooth engaging plates 24 are secured to opposite sides of each pallet 13 by means of rivets 26 which extend through integral supporting projections 27 formed on the sides of the pallets. The teeth engaging plates 24 are positioned intermediate the wheels 18 on opposite sides of the pallets 13.

Referring to Figure 3 of the drawings, it will be seen that as each of the pallets 13 is elevated by a pair of sprocket teeth 17 around the return bend at the feed end of the sintering machine 19, the wheels 18 run on the track section 20 which has an arcuate curvature. On the opposite ends of each pallet 13 is a so-called hinge axis which lies in a horizontal plane and which generates a segment of a cylindrical surface as the pallet is elevated. When a pallet 13 is in an upright position, the hinge axes are located approximately at the bottom corners of the front and back ends on the pallet bumping lugs 28. The bumping lugs 28 are shown and described in my Patent No. 2,401,204, May 28, 1946. The principal axes of the pallet wheels 18 also generate a cylindrical surface as each pallet is elevated around the track section 20.

If a sprocket wheel tooth 17 could be applied to a pallet, either at one of the hinge axes or at one of the axes of the pallet wheels 18, it would then be possible to shape the sprocket tooth in the form of an involute of a circle having a radius corresponding to the radius of curvature of either the cylindrical surface generated by the hinge axes or the wheel axes, as the case might be. If this were done, it would be possible to maintain complete contact between the engaging surface of the tooth and a corresponding bearing surface on the pallet throughout the complete travel of a pallet 13 from the lower run to the upper run.

However, for design reasons, it is not practical to have a sprocket tooth engage a bearing surface located on the side of a pallet 13 at either of these positions, i. e., a hinge axis or an axis of a wheel 18. On the contrary, practical design dictates that the tooth engage a surface provided intermediate the hinge axes and also intermediate between each pair of wheels 18. At such an intermediate location, any base axis for a tooth engaging surface no longer follows a circular path as the pallet is elevated, but instead, shifts along or follows an irregular curve in its transition from a circle to a straight line. However, by means of the present invention it is possible to provide a sprocket wheel tooth of such contour or shape that it will remain in substantially complete surface contact with a correspondingly shaped tooth engaging plate located on the side of a pallet 13 intermediate between the wheels 18, such as one of the plates 24 in Figure 2 of the drawings. The contour or shape of such a tooth and the corresponding engaging surface of a plate 24 are obtained in the following manner, having reference particularly to Figure 4 of the drawings.

On Figure 4 is shown the trace or path generated by a hinge axis in the transition of a pallet 13 around the track section 20 from the lower run 12 to the upper run 11. The radius of curvature of the segment of the cylindrical surface generated by such an axis is designated at OL. A chord AB is drawn across the circular trace of the axis, this chord having a length which corresponds to the distance between hinge axes on opposite ends of a pallet 13.

The rise CD of the chord AB starts out at zero value at the junction of the lower run trace of a hinge axis and its arcuate trace of radius OL, then increases to the full value CD, and again diminishes to zero value at the junction of the arcuate trace with the upper run trace. By deducting half of the chordal rise CD from the radius of the arcuate trace, i. e., OL, a new radius OM is obtained which gives a tooth base circle from which an involute shaped tooth can be laid out according to the well known methods of gear tooth design.

The tooth mating recess or surface of a tooth engaging plate 24 (Figure 2) is correspondingly laid out, so as to have the same shape or contour as a tooth 17.

When projecting teeth 17 and tooth engaging plates 24 are provided with engaging surfaces contoured or shaped in accordance with the above outlined specifications, the individual teeth 17 will enter into full engagement with a tooth engaging plate 24 at the bottom of the arcuate section 20, and will continue to remain in substantially complete engagement therewith, as shown in Figure 2 of the drawings, throughout the elevation of the particular pallet to the upper run. Since a maximum amount of bearing area engagement is obtained between projecting teeth and teeth engaging surfaces, shaped in accordance with the principles of this invention, the bearing pressure between these parts is reduced to a minimum, with the concurrent result that maximum wear of the teeth and engaging plates is obtained.

Having fully set forth the principles of the invention, and having described in detail a preferred embodiment thereof, what is claimed as new is:

1. In a continuous type of sintering machine having upper and lower runs in the form of track sections interconnected at the feed end by a return bend in the form of an arcuate track section, and wherein the material to be sintered is carried on a train of pallets each of which is provided on opposite sides with a pair of wheels adapted to roll on said track sections, said pallets having horizontal hinge axes at opposite ends thereof each of which axes generates a segment of a cylindrical surface as each pallet is elevated up and around said return bend on said arcuate track section, and wherein a pair of co-axially aligned sprocket wheels with projecting teeth equi-spaced therearound are provided at opposite sides of said arcuate track sections in such position that each projecting tooth on each sprocket wheel in cooperation with an opposed projecting tooth on the other sprocket wheel successively engages tooth engaging surfaces provided on opposite sides of each of said pallets intermediate said pair of wheels thereon so as to lift said pallets from said lower run to said upper run at said return bend, the improvement which comprises, shaping the pallet engaging surface of each of said projecting teeth and said tooth engaging surfaces on opposite sides of said pallets in the form of an involute of a base circle established by subtending a circle having a radius of curvature of said cylindrical surface with a chord corresponding in length to the distance between said horizontal hinge axes on opposite ends of each pallet, and then using the radius of curvature shortened by one-half the rise of said chord as the radius of said base circle.

2. The improvement called for in claim 1 wherein said tooth engaging surfaces are provided by replaceable wear plates secured on opposite sides of said pallets intermediate said pair of wheels thereon.

3. In a continuous type sintering machine comprising an endless track with pallets travelling thereon and sprocket wheels at the feed end return bend of the track for raising the pallets thereabout with each pallet in endwise hinging contact with the next adjacent pallet, tooth contacting members on the respective pallets, and teeth on said sprocket wheels disposed to contact said members and thereby raise the pallets about said bend, the contacting surfaces of the respective teeth and pallet tooth contacting members being of involute curvature constructed on a base circle having a radius approximately equal to the radius of the arc described by the hinge axes of said pallets travelling about said bend minus one-half of the chordal rise of such pallets.

WILLIAM J. URBAN.

REFERENCES CITED

The following references are of record in the file of this patent:

UNITED STATES PATENTS

| Number | Name | Date |
|---|---|---|
| 845,795 | Knox | Mar. 5, 1907 |
| 1,204,633 | Yost | Nov. 14, 1916 |